United States Patent
Jung et al.

(10) Patent No.: US 6,511,769 B1
(45) Date of Patent: Jan. 28, 2003

(54) ELECTROLYTE FOR RECHARGEABLE LITHIUM BATTERY

(75) Inventors: Wong-Il Jung, Chungcheongnam-do (KR); Duck-Chul Hwang, Chungcheognam-do (KR); Eui-Hwan Song, Chungcheongnam-do (KR)

(73) Assignee: Samsung SDI Co., Ltd (KR)

( * ) Notice: Subject to any disclaimer, the term of this patent is extended or adjusted under 35 U.S.C. 154(b) by 0 days.

(21) Appl. No.: 09/565,154

(22) Filed: May 3, 2000

(30) Foreign Application Priority Data

May 3, 1999 (KR) .............................. 99-15925
Sep. 1, 1999 (KR) .............................. 99-36933

(51) Int. Cl.$^7$ .................... H01M 10/50; H01M 10/40
(52) U.S. Cl. .................... 429/62; 429/306; 429/317; 429/341; 429/342
(58) Field of Search .................... 429/61, 62, 303, 429/306, 317, 324, 331, 332, 338, 341, 342, 189

(56) References Cited

U.S. PATENT DOCUMENTS

| | | | | | |
|---|---|---|---|---|---|
| 5,112,512 | A | * | 5/1992 | Nakamura | 429/313 X |
| 5,159,001 | A | * | 10/1992 | Motogami et al. | 429/317 X |
| 5,217,827 | A | * | 6/1993 | Fauteux et al. | 429/317 X |
| 5,506,068 | A | | 4/1996 | Dan et al. | 429/50 |
| 5,830,600 | A | | 11/1998 | Narang et al. | |
| 6,019,908 | A | * | 2/2000 | Kono et al. | 429/306 X |
| 6,096,234 | A | * | 8/2000 | Nakanishi et al. | 429/317 X |
| 6,096,456 | A | * | 8/2000 | Takeuchi et al. | 429/320 X |

FOREIGN PATENT DOCUMENTS

JP 11-144758 * 5/1999 .......... H01M/10/40

* cited by examiner

Primary Examiner—Stephen Kalafut
(74) Attorney, Agent, or Firm—Blakely Sokoloff Taylor & Zafman

(57) ABSTRACT

An electrolyte for rechargeable lithium battery including a lithium salt, an organic solvent and a thermosetting organic compound is provided.

14 Claims, 1 Drawing Sheet

ELECTROLYTE FOR RECHARGEABLE LITHIUM BATTERY

CROSS REFERENCE TO RELATED APPLICATION

This application is based on applications Nos. 99-15925 and 99-36933 filed in the Korean Industrial Property Office on May 3, 1999 and Sep. 1, 1999, the content of which is incorporated hereinto by reference.

BACKGROUND OF THE INVENTION (a) Field of the Invention

The present invention relates to an electrolyte for a rechargeable lithium battery and, more particularly, to an electrolyte for a rechargeable lithium battery which can provide a rechargeable lithium battery having good safety characteristics.

(b) Description of the Related Art

In recent years, the development of miniaturized portable electronics provokes needs for a rechargeable lithium battery having a high capacity as well as a light weight. The rechargeable lithium battery employs materials into or from where lithium ion can be intercalated or deintercalated for positive and negative active materials. In the rechargeable lithium battery, organic or polymer electrolyte is used.

For develop the rechargeable lithium battery having high capacity, the safety characteristics of the battery is very important. According to repeated charge and discharge cycle, lithium is extracted from a negative electrode. The lithium explosively reacts with an electrolyte, which leads the explosion of the rechargeable lithium battery under the remarkable increased in the temperature and pressure due to the extreme condition such overcharge, feed-through or compression.

Studies on active materials, separators, system or electrolytes are attempted to insure the safety characteristics of the rechargeable lithium battery.

One method to insure the safety characteristics of the rechargeable lithium battery is that a porous polymer film having low melting point is used for a separator. In this case, when internal temperature of the battery is remarkably raised, the porous polymer film is melt, thereby blocking pores of the film and preventing the movement of lithium ions between electrodes. The method can theoretically prevent the increases in current and temperature, but because the polymer film for the separator has relatively higher melting point, the method does not effectively prevent the reaction of lithium and electrolyte.

Another method to insure the safety characteristics is that when pressure is increased by the generation of gas in the battery, shut-down of the battery is induced. However, the method does not effectively prevent the reaction of lithium and electrolyte.

Still another method to insure the safety characteristics uses an electrolyte an organic solvent and lithium salts. The organic solvent includes cyclic carbonate such ethylene carbonate, propylene carbonate, chain carbonate such diethyl carbonate, ether, ester or ketone. However, when the electrolyte is employed in a rechargeable lithium battery having high capacity, the satisfied safety effect is not obtained.

Still another method to insure the safety characteristics, U.S. Pat. No. 5,506,068 discloses 1,3-dioxolane for an electrolyte. The electrolyte is prepared by mixing 1,3-dioxolane, $LiAsF_6$ as a lithium salt and tertiary amine as a polymerization inhibitor (stabilizer). The electrolyte thermally polymerizes at 4.0V and more, and 100° C. Accordingly, the electrolyte can prevent the diffusion of temperature. Furthermore, a rechargeable lithium battery with the electrolyte has good battery performance. However, because the electrolyte has electrochemically stability at 4.0V and less, the electrolyte is not applicable to a high-capacity rechargeable lithium battery in which cut-off occurs at 4.2 to 4.3V When the electrolyte is used in the high-capacity rechargeable lithium battery, the capacity is reduced by the reaction of electrolyte.

U.S. Pat. No. 5,830,600 discloses that phosphate-based fire-retardant agent and pyrocarbonate-based solvent as $CO_2$-generating compound are added to an electrolyte to insure cycle and safety characteristics. However, the method should use at least 50 volume percent of phosphate-based solvent such that ion conductivity is decreased.

SUMMARY OF THE INVENTION

It is an object of the present invention to provide an electrolyte for a rechargeable lithium battery which can provide a rechargeable lithium battery having good safety and high capacity.

It is another object to provide an electrolyte for a rechargeable lithium battery which can provide a rechargeable lithium battery having good initial charge and discharge cycle life.

These and other objects may be achieved by an electrolyte for a rechargeable lithium battery including a lithium salt, an organic solvent and a thermosetting organic compound.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying, wherein.

DETAILED DESCRIPTION OF THE INVENTION

Figure 1:
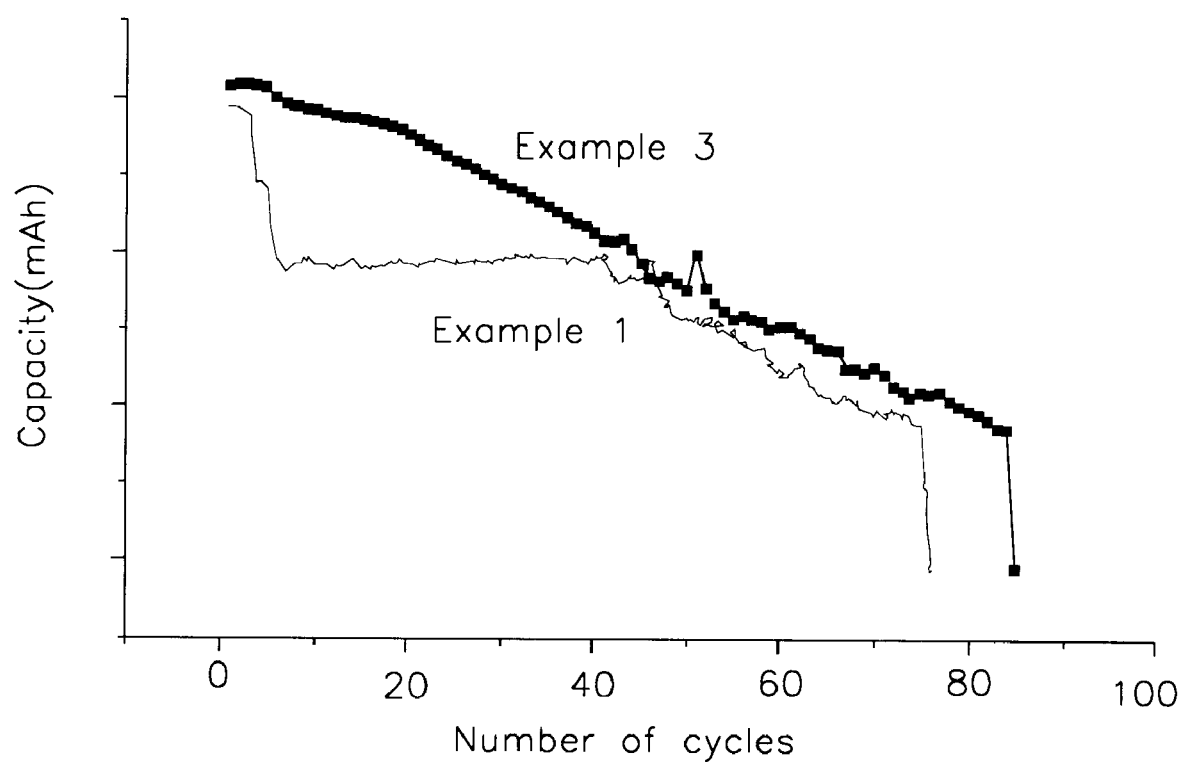
FIG. 1 is a graph showing charge and discharge cycle characteristics of rechargeable lithium batteries with electrolytes of Examples 1 and 3 of the present invention, respectively.

An electrolyte of the present invention includes a lithium salt, an organic solvent and a thermosetting organic compound. The electrolyte may further include a pyrocarbonate-based compound or diallyl carbonate, or a thermosetting initiator.

The electrolyte includes the thermosetting organic compound of 10 to 70 volume percent, preferably 30 to 50 volume percent. When the amount of the thermosetting organic compound exceeds 70 volume percent, the viscosity of the electrolyte is extremely high and the electrolyte is difficult to uniformly immersed into electrodes. Whereas, the amount of the electrolyte is less than 10 volume percent, the effect of the thermosetting organic compound on the safety characteristics is low.

In the present invention, for the thermosetting organic compound, monomer, oligomer or polymer which having the thermosetting characteristics is used. Oligomer is preferably used, more preferably polyolefinic thermosetting oligomer. Most preferably, polyolefinic thermosetting oligomer having ethylene oxide groups of which one end or both ends link to at least one double bond is used. When polyolefinic thermosetting oligomer having ethylene oxide groups of which one end or both ends link to at least one double bond is used in the electrolyte, the battery having excellent safety characteristics can be obtained.

The exemplary of the polyolefinic thermosetting oligomer includes poly(ethylene glycol) acrylate, poly(ethylene glycol) methacrylate poly(ethylene glycol) diacrylate, poly(ethylene glycol) methacrylate, poly(ethylene glycol) diacrylate, poly(ethylene glycol) divinyl ether, poly(ethylene glycol) 4-nonylphenyl ether acrylate or poly(ethylene glycol) phenyl ether acrylate. The molecular weight thereof is hundreds to thousands, generally 100 to 5000. However, the polyolefinic thermosetting oligomer is not limited to the 100 to 5000 of the molecular weight.

By increasing temperature, double bonds in the thermosetting organic compound, particularly oligomer, breaking and cross-linking and polymerization occurs such that the thermosetting organic compound solidify. Accordingly, when the thermosetting organic compound is added to an organic solvent of an electrolyte, the electrolyte is thermosetted by reacting lithium with the electrolyte and increasing temperature and pores of a separator immersed with the electrolyte are blocked. By blocking pores of the separator, the heat diffusion can be prevented. Furthermore, by blocking pores, the movement of lithium ion between negative and positive electrodes through the pores can be prevented. Therefore, current is effectively blocked and the increases in temperature can be prevented. Furthermore, the explosion of the battery can be prevented. The thermosetting organic compound has good electrochemical safety and dissolution of ions such that the organic compound acts stabilizer as well as electrolyte salt. As a result, the electrolyte can increase capacity of the battery and thus the electrolyte can provide a rechargeable lithium battery having high capacity. Particularly, polyolefinic thermosetting oligomer has ethylene oxides, improving ion conductivity and the polymerization thereof quickly occurs at high temperatures, improving safety characteristics.

The electrolyte may further include a thermosetting initiator. By the thermosetting initiator, the cross-liking occurs at relatively lower temperature and the electrolyte is thermoset at relatively lower temperature. Accordingly, the battery explosion can be effectively prevented. The thermosetting initiator may include any one of the known thermosetting initiators. The example thereof includes organic peroxides such dibenzoyl hydroperoxide, dilauryl peroxide. The thermosetting initiator may use the sufficient amount to initiate the theremosetting reaction of the thermosetting organic compound. Generally, the amount of the thermosetting initiator is 0.1 to 5.0 volume %, but the amount is not limited to this range.

The electrolyte of the present invention can provide a rechargeable lithium battery having good safety by including the thermosetting organic compound. However, the thermosetting organic compound may be slightly reduced initial charge and discharge cycle life of the battery. In order to solve this problem, the electrolyte of the present invention further includes a pyrocarbonate-based compound of diallyl carbonate. Namely, the electrolyte of the present invention has good safety characteristics owing to the thermosetting organic compound and good initial charge and discharge cycle characteristics owing to the pyrocarbonate-based compound or diallyl carbonate. The pyrocarbonate-based compound includes dimethyl pyrocarbonate, diethyl pyrocarbonate, di-tert-butyl pyrocarbonate and dibenzyl pyrocarbonate, but is not limited.

The amount of pyrocarbonate-based compound or diallyl carbonate is 0.1 to 20 volume percent, preferably 0.2 to 0.7 volume percent. When the amount thereof is larger than 20 volume percent, $CO_2$ too generates and the battery is expanded and total battery's volume is extremely large. The expansion of the battery causes the increases in the internal pressure of the cell and separates protection devices such as a current break or a positive temperature coefficient device (PTC) from the inside of the cell. Whereas, when the amount thereof is less than 0.1 volume percent, the effect on the cycle life characteristics is low. The effect on the cycle life characteristics may be obtained by generating layer on the interface layer of the negative electrode and the electrolyte.

The organic solvent of the electrolyte includes cyclic carbonate, chain carbonate, ester, ether or ketone. The cyclic carbonate includes ethylene carbonate, propylene carbonate or a mixture thereof. The chain carbonate includes dimethyl carbonate, diethyl carbonate, ethylmethyl carbonate, methylpropyl carboante or a mixture thereof. The ester includes n-methyl acetate, n-ethyl acetate or n-propyl acetate. The ketone includes polyvinyl ketone. In the present invention, propylene carbonate is used for the organic solvent because pyrocarbonate-based compound or diallyl carbonate generates $CO_2$ at porous region of the surface of the negative electrode and forms layer which acts the prevention of oxidation of the surface of the negative electrode by propylene carbonate. The electrolyte includes 30 to 90 volume percent, preferably 50 to 80 volume percent of the organic solvent.

The lithium salt dissolved in the organic solvent uses any material being capable of accelerating the movement of lithium ions between positive and negative electrode. The example thereof includes $LiPF_6$, $LiAsF_6$, $LiCF_3SO_3$, $LiN(CF_4SO_2)_3$, $LiBF_6$ or $LiClO_4$.

The electrolyte of the present invention has good safety characteristics without the deterioration of initial discharge capacity and efficiency. Namely, the battery with the electrolyte of the present invention is safety under the overcharge, short circuit, compression and feed-through and has high capacity because the electrolyte has electrochemical stable at 4.5V more than. Furthermore, the battery has good initial charge and discharge cycle life characteristics. In the present invention, the thermosetting organic compound and optionally the initiator are added to the conventional electrolyte for improve safety characteristics and pyrocarbonate-based compound or diallyl carbonate is added thereto for improve initial charge and discharge cycle characteristics.

A positive active material in the rechargeable lithium battery with the electrolyte of the present invention may use transition metal compound. The example includes transition metal oxides such $LiCoO_2$, $LiNiO_2$, $LiNi_xCo_{1-x}M_yO_2$ ($0.1<x<1.0$, $0 \leq y<1.0$, M is a transition metal), $LiMnO_2$ or $LiMn_2O_4$. A method of producing a positive electrode using the positive active material is well known in the related art. One positive electrode producing method is that the positive active material and a polyvinylidene fluoride binder are mixed with a N-methyl pyrrolidone solvent to prepare a slurry. The slurry is tape-cast on an aluminum foil to produce a positive electrode. A conductivity agent such as ketjen black, carbon black or acetylene black may is added to the slurry.

A negative active material may use carbonaceous material. The example thereof includes crystalline graphite which has voltage flatness and reversible charge and discharge. Methods of producing a negative electrode using the negative active material are well known in the related art. The negative active material is mixed with a polyvinylidene fluoride binder to prepare a slurry. The slurry is tape-cast on a copper foil to produce a negative active material.

The following examples further illustrate the present invention.

EXAMPLE 1

$LiNi_{0.9}Co_{0.1}Sr_{0.0002}O_2$ was used for a positive active material, polyvinylidene fluoride was used for a binder and acetylene black was used for a conductive agent to produce a positive electrode by the conventional process. Crystalline graphite available from Osaka gas under the trade name of PCG 2m15 was used and polyvinylidene fluoride was used for a binder to produce a negative electrode. 1.3M of $LiPF_6$, 70 volume percent of an organic solvent and 30 volume percent of triethylene glycol dimethacrylate for a thermosetting oligomer were mixed to produce an electrolyte. The organic solvent included ethylene carbonate, ethylmethyl carbonate and dietyl carbonate (4:4:1 volume ratio). By using the positive and negative electrodes and the electrolyte, a 18650 type rechargeable lithium cell was manufactured.

EXAMPLE 2

A 18650 type rechargeable lithium cell was manufactured by the same procedure in Example 1 except that an electrolyte was produced by using 1.3M of $LiPF_6$, 70 volume percent of a mixture of ethylene carbonate/ethylmethyl carboante/diethylene carbonate (4:3:3 volume ratio) for an organic solvent and 30 volume percent of triethylene glycol dimethacrylate.

Comparative Example 1

A 18650 type rechargeable lithium cell was manufactured by the same procedure in Example 1 except that an electrolyte was produced by using 1.3M of $LiPF_6$ and 100 volume percent of a mixture of ethylene carbonate/ethylmethyl carboante/diethylene carbonate (4:4:1 volume ratio) for an organic solvent.

Comparative Example 2

A 18650 type rechargeable lithium cell was manufactured by the same procedure in Example 1 except that an electrolyte was produced by using 1.3M of $LiPF_6$ and 100 volume percent of a mixture of ethylene carbonate/ethylmethyl carboante/diethylene carbonate (3:4:3 volume ratio) for an organic solvent.

Comparative Example 3

A 18650 type rechargeable lithium cell was manufactured by the same procedure in Example 1 except that an electrolyte was produced by using 1.3M of $LiPF_6$ and 100 volume percent of a mixture of ethylene carbonate/ethylmethyl carboante/diethylene carbonate (4:3:3 volume ratio) for an organic solvent.

Nine rechargeable lithium cells according to Example 1 and ten rechargeable lithium cells according to Example 2 were manufactured. For reference, the nine rechargeable lithium cells of Example 1 were labeled from A to J and the ten rechargeable lithium cells of Example 2 were labeled from A to K. Using these rechargeable lithium cells, 1C overcharge test (A–D cells of Examples 1 and 2) and cell feed-through test (G–I cells of Example 1 and G–K cells of Example 2) were performed and the results are shown in Table 1. Furthermore, six cells according to Comparative example 1, six cells, Comparative example 2 and six cells, Comparative example 3, total eighteen cells were manufactured and cell feed-through test was performed. The results are shown in Table 2. The eighteen cells were labeled to from a to g. In Tables 1 and 2, OCV indicates open-circuit voltage and means that the battery is charged to OCV for obtaining usable condition. In Tables 1 and 2, "safety" in result means that the battery passes the cell safety test and "explosion" means that the battery does not pass the cell safety test.

TABLE 1

|  |  | Sample No. | OCV before test (V) | Test result Temperature [° C.] | Final result |
|---|---|---|---|---|---|
| 1C over-charge | Example 1 | A | 4.080 | 86.1 | Safety |
|  |  | B | 4.078 | 96.5 | Safety |
|  |  | C | 4.086 | 84.5 | Safety |
|  |  | D | 4.082 | 83.8 | Safety |
|  | Example 2 | A | 4.004 | 98.9 | Safety |
|  |  | B | 4.090 | 52.7 | Safety |
|  |  | C | 4.074 | 99.6 | Safety |
|  |  | D | 4.090 | 110.6 | Safety |
| Feed-through | Example 1 | E | 4.088 | 97.9 | Safety |
|  |  | F | 4.085 | 96.4 | Safety |
|  |  | G | 4.082 | 87.6 | Safety |
|  |  | H | 4.080 | 89 | Safety |
|  |  | I | 4.087 | 87.3 | Safety |
|  |  | J | 4.086 | 76.8 | Safety |
|  | Example 2 | E | 4.087 | 87.7 | Safety |
|  |  | F | 4.086 | 90 | Safety |
|  |  | G | 4.086 | 94.8 | Safety |
|  |  | H | 4.086 | 87.8 | Safety |
|  |  | I | 4.086 | 96.4 | Safety |
|  |  | J | 4.083 | 88 | Safety |
|  |  | K | 4.083 | 87.5 | Safety |

TABLE 2

|  |  | Sample No. | OCV before test (V) | Test result Maximum temperature [° C.] | Final result |
|---|---|---|---|---|---|
| Feed-through | Com. 1 | a | 4.089 | 617 | Explosion |
|  |  | b | 4.085 | 498 | Explosion |
|  |  | c | 3.872 | 92 | Safety |
|  |  | d | 4.035 | 468 | Explosion |
|  |  | e | 4.026 | 168 | Explosion |
|  |  | f | 3.917 | 334 | Explosion |
|  | Com. 2 | a | 4.085 | 382 | Explosion |
|  |  | b | 4.934 | 391 | Explosion |
|  |  | c | 3.850 | 65 | Safety |
|  |  | d | 4.090 | 172 | Safety |
|  |  | e | 4.090 | 645 | Explosion |
|  |  | F | 4.090 | 58 | Safety |
|  | Com. 3 | a | 3.792 | 75 | Safety |
|  |  | b | 4.084 | 477 | Explosion |
|  |  | c | 4.087 | 93 | Safety |
|  |  | d | 4.086 | 476 | Explosion |
|  |  | e | 4.079 | 494 | Explosion |
|  |  | f | 3.994 | 513 | Explosion |

As shown in Tables 1 and 2, the cells of Examples 1 and 2 has maximum temperature of about 50 to 110° C., but the cells of Comparative examples 1–3 has maximum temperature of about 60 to 650° C. Namely, the temperature of cells of Comparative examples 1–3 is increased to very high temperature, 650° C. such that the cells of Comparative examples 1–3 are easily exploded. On the other hand, because the maximum temperature of cells of Examples 1 and 2 is relatively lower temperature, about 110° C., the cells of Examples 1 and 2 are difficultly exploded and has good safety. Accordingly, the cells of Examples 1 and 2 are the safest cell, but the cells of Comparative examples 1–3 are not safety. In other words, the cells of Examples 1 and 2 passed the safety test, whereas only three cells of eighteen of Comparative examples 1–3 passed the safety test. Generally, when ten same cells are performed the safety test and at least two cells do not passed the test, the cell can not used by reason of the safety problem. Therefore, the cells of Comparative examples 1–3 are unusable.

EXAMPLE 3

A 18650 type cell was manufactured by the same procedure in Example 1 except that an electrolyte was produced by using 1.3M LiPF$_6$, 69.5 volume percent of a mixture of ethylene carbonate, ethylmethyl carbonate and diethylene carbonate for an organic solvent (4:4:1 volume ratio), 30 volume percent of triethylene glycol dimethacrylate for a thermosetting oligomer and 0.5 volume percent of dimethyl pyrocarbonate.

Comparative Example 4

A 18650 type cell was manufactured by the same procedure in Example 1 except that an electrolyte was produced by using 1.3M LiPF$_6$ and 100 volume percent of a mixture of ethylene carbonate, ethylmethyl carbonate and diethylene carbonate for an organic solvent (4:4:1 volume ratio).

Ten cells according to Example 3 and the cells according to Comparative example 4 were respectively manufactured. The cells of Example 3 were labeled from I to X and the cells of Comparative example 4 were labeled from i to x. The cells were performed the cell feed-through test (I–V cells of Example 3 and i–v cells of Comparative example 4) and 1C overcharge test (VI–X cells of Example 3 and vi–x cells of Comparative example 4) and the results are shown in Tables 3 and 4, respectively.

TABLE 3

| Test | Sample No. | OCV before test (V) | Test result Maximum temperature [° C.] | Final result |
| --- | --- | --- | --- | --- |
| Feed-through | I | 4.156 | 65 | Safety |
|  | II | 4.155 | 83 | Safety |
|  | III | 4.145 | 67 | Safety |
|  | IV | 4.156 | 72 | Safety |
|  | V | 4.174 | 74 | Safety |
| Overcharge and feed-through | VI | 4.280 | 68 | Safety |
|  | VII | 4.279 | 80 | Safety |
|  | VIII | 4.264 | 51 | Safety |
|  | IX | 4.284 | 72 | Safety |
|  | X | 4.285 | 61 | Safety |

TABLE 4

| Test | Sample No. | OCV before test (V) | Test result Maximum temperature [° C.] | Final result | |
| --- | --- | --- | --- | --- | --- |
| Feed-through | i | 4.140 | 90 | Explosion | Temperature sensor separate |
|  | ii | 4.174 | 45 | Explosion | Temperature sensor separate |
|  | iii | 4.176 | 325 | Explosion | Temperature sensor separate |
|  | iv | 4.173 | 92 | Safety | |
|  | v | 4.133 | 116 | Explosion | Temperature sensor separate |

TABLE 4-continued

| Test | Sample No. | OCV before test (V) | Test result Maximum temperature [° C.] | Final result | |
| --- | --- | --- | --- | --- | --- |
| Overcharge and feed-through | vi | 4.298 | 435 | Explosion | Temperature sensor separate |
|  | vii | 4.290 |  | Explosion | Temperature sensor breakage |
|  | viii | 4.297 | 280 | Explosion | Temperature sensor separate |
|  | ix | 4.297 | 80 | Safety | |
|  | x | 4.297 | 264 | Explosion | |

As shown in Tables 3 and 4, the maximum temperature of cell of Example 3 is about 50 to 80° C., whereas that of cell of Comparative example 4 is about 90 to 450° C. Accordingly, because the temperature of the cell of Comparative example is very high, the cell of Comparative example can be easily exploded. Namely, the explosion of the cell of Example 3 does not occur, whereas the explosion of the cell of Comparative example 4 occurs. Accordingly, the cell of Example 3 is the safest cell, but the cell of Comparative example 4 is not the safety. The all cells of Example 3 passed the safety test, whereas only two cells of ten cells of Comparative example 4 passed the safety test. Generally, when the ten same cells are performed the safety test and at least two cells do not passed the test, the cell can not be used by the reason of the safety problem. Therefore, the cell of Comparative example 4 is unusable. Although pyrocarbonate is added to the electrolyte of the present invention including the thermosetting organic compound, the safety effect owing to the thermosetting organic compound dose not decreased.

For identifying the improvement of initial charge and discharge characteristics owing to pyrocarbonate, the initial charge and discharge characteristics of the cells of Examples 1 and 3 were measured. The results are shown in FIG. 1. As shown in FIG. 1, the decreases in capacity are smaller in the cell of Example 3 than in that of Example 1. Accordingly, the cell of Example 3 with pyrocarbonate-based compound has good initial charge and discharge characteristics when compared with that of Example 1.

In the electrolyte of the present invention, a thermosetting organic compound is solidified by raising temperature, thereby preventing the reaction of electrolyte and lithium and preventing the explosion of the battery. The electrolyte of the present invention including pyrocarbonate-based compounds or diallyl carbonate, can provide a rechargeable lithium battery having initial charge and discharge characteristics.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. An electrolyte for a rechargeable lithium battery comprising:
    a lithium salt;
    an organic solvent; and
    30 to 50 volume percent of a thermosetting organic compound, wherein the thermosetting organic compound is selected from the group consisting of poly (ethylene glycol)acrylate, poly(ethylene glycol) methacrylate, poly(ethylene glycol)diacrylate, poly(ethylene glycol)divinyl ether, poly(ethylene glycol) 4-nonylphenyl ether acrylate and poly(ethylene glycol) phenyl ether acrylate.

2. The electrolyte of claim 1 wherein the thermosetting organic compound is a monomer, an oligomer or a polymer.

3. The electrolyte of claim 2 wherein the thermosetting organic compound is an oligomer.

4. The electrolyte of claim 3 wherein the oligomer is polyethylene oxide-based thermosetting oligomer.

5. The electrolyte of claim 4 wherein the polyethylene oxide-based thermosetting oligomer has at least one double bond at one or both ends of ethylene oxide.

6. The electrolyte of claim 1 wherein the electrolyte further includes a pyrocarbonate-based compound or diallyl carbonate.

7. The electrolyte of claim 1 wherein the electrolyte includes 0.1 to 20 volume percent of a pyrocarbonate-based compound or diallyl carbonate.

8. The electrolyte of claim 1 wherein the electrolyte further includes a thermosetting initiator.

9. The electrolyte of claim 1 wherein the organic solvent is at least one organic solvent selected from the group consisting of cyclic carbonate, chain carbonate, ester, ether and ketone.

10. The electrolyte of claim 9 wherein the cyclic carbonate is selected from the group consisting of ethylene carbonate, propylene carbonate and a mixture thereof.

11. The electrolyte of claim 9 wherein the chain carbonate is at least one carbonate selected from the group consisting of dimethyl carbonate, diethyl carbonate, ethylmethyl carbonate and methylpropyl carbonate.

12. The electrolyte of claim 9 wherein the ester is selected from the group consisting of n-methyl acetate, n-ethyl acetate and n-propyl acetate.

13. An electrolyte for a rechargeable lithium battery comprising:

a lithium salt;

an organic solvent;

30 to 50 volume percent of a thermosetting organic compound; and a pyrocarbonate-based compound or diallyl carbonate.

14. An electrolyte for a rechargeable lithium battery comprising:

a lithium salt;

an organic solvent;

30 to 50 volume percent of a thermosetting organic compound; and 0.1 to 20 volume percent of a pyrocarbonate-based compound or diallyl carbonate.

* * * * *

UNITED STATES PATENT AND TRADEMARK OFFICE
CERTIFICATE OF CORRECTION

PATENT NO. : 6,511,769 B1
DATED : January 28, 2003
INVENTOR(S) : Jung et al.

It is certified that error appears in the above-identified patent and that said Letters Patent is hereby corrected as shown below:

Title page,
Item [75], Inventors, delete "Wong" and insert -- Won --.

Signed and Sealed this

Thirtieth Day of November, 2004

JON W. DUDAS
*Director of the United States Patent and Trademark Office*